(12) United States Patent
Oliver et al.

(10) Patent No.: US 8,863,291 B2
(45) Date of Patent: Oct. 14, 2014

(54) REPUTATION CHECKING OF EXECUTABLE PROGRAMS

(75) Inventors: Daniel Oliver, Seattle, WA (US); Anshul Rawat, Kirkland, WA (US); Xiang Tu, Bellevue, WA (US); Ryan Colvin, Bothell, WA (US); James Dooley, Bellevue, WA (US); Elliott Jeb Haber, Fall City, WA (US); Ameya Bhatawdekar, Issaquah, WA (US); Andy Davidson, Kirkland, WA (US); Jay Dave, Sammamish, WA (US); Paul Leach, Seattle, WA (US); Karanbir Singh, Seattle, WA (US); Chris Guzak, Kirkland, WA (US); Crispin Cowan, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 117 days.

(21) Appl. No.: 13/010,189

(22) Filed: Jan. 20, 2011

(65) Prior Publication Data
US 2012/0192275 A1 Jul. 26, 2012

(51) Int. Cl.
| G06F 11/00 | (2006.01) |
| G06F 12/14 | (2006.01) |
| G06F 12/16 | (2006.01) |
| G08B 23/00 | (2006.01) |
| G06F 21/51 | (2013.01) |

(52) U.S. Cl.
CPC .................................... *G06F 21/51* (2013.01)
USPC .............................................. 726/25; 726/22

(58) Field of Classification Search
CPC ........................................................ G06F 21/51
USPC ........................................................ 726/22–25
See application file for complete search history.

(56) References Cited

U.S. PATENT DOCUMENTS

| 7,668,951 B2 | 2/2010 | Lund et al. |
| 7,761,912 B2 | 7/2010 | Yee et al. |

(Continued)

FOREIGN PATENT DOCUMENTS

| WO | 2009094086 A2 | 7/2009 |
| WO | 2010/002638 A2 | 1/2010 |

OTHER PUBLICATIONS

"Web of Trust for Firefox", Retrieved at << http://download.cnet.com/Web-of-Trust-for-Firefox/3000-11745_4-10588554.html >>, Nov. 24, 2009, pp. 7.

(Continued)

*Primary Examiner* — Andrew Nalven
*Assistant Examiner* — Khang Do
(74) *Attorney, Agent, or Firm* — Bryan Webster; Kate Drakos; Micky Minhas (57) ABSTRACT

The reputation of an executable computer program is checked when a user input to a computing device initiates a program launch, thus triggering a check of a local cache of reputation information. If the local cache confirms that the program is safe, it is permitted to launch, typically without notifying the user that a reputation check has been made. If the local cache cannot confirm the safety of the program, a reputation check is made by accessing a reputation service in the cloud. If the reputation service identifies the program as safe, it returns an indication to the computing device and the program is permitted to be launched, again without notifying the user that a reputation check has been made. If the reputation service identifies the program as unsafe or potentially unsafe, or does not recognize it at all, a warning is displayed to the user.

8 Claims, 4 Drawing Sheets

(56) References Cited

U.S. PATENT DOCUMENTS

| | | | |
|---|---|---|---|
| 2002/0161637 | A1 | 10/2002 | Sugaya et al. |
| 2005/0198181 | A1 | 9/2005 | Ritter |
| 2006/0095404 | A1 | 5/2006 | Adelman et al. |
| 2006/0212270 | A1 | 9/2006 | Shiu et al. |
| 2006/0212931 | A1 | 9/2006 | Shull et al. |
| 2006/0253581 | A1 | 11/2006 | Dixon et al. |
| 2006/0253583 | A1 | 11/2006 | Dixon et al. |
| 2007/0050444 | A1 | 3/2007 | Costea et al. |
| 2007/0255702 | A1 | 11/2007 | Orme |
| 2008/0005223 | A1 | 1/2008 | Flake et al. |
| 2008/0209031 | A1 | 8/2008 | Zhu et al. |
| 2008/0288278 | A1 | 11/2008 | Buss |
| 2009/0204542 | A1 | 8/2009 | Doman et al. |
| 2009/0249335 | A1 | 10/2009 | Vasilevsky et al. |
| 2009/0271428 | A1 | 10/2009 | Adelman et al. |
| 2009/0328209 | A1* | 12/2009 | Nachenberg .................. 726/22 |
| 2010/0005291 | A1* | 1/2010 | Hulten et al. ................ 713/156 |
| 2010/0042942 | A1 | 2/2010 | Vasilevsky et al. |
| 2011/0067101 | A1 | 3/2011 | Seshadri et al. |
| 2011/0154018 | A1 | 6/2011 | Edstrom et al. |
| 2011/0197159 | A1 | 8/2011 | Chaganti et al. |
| 2011/0219448 | A1 | 9/2011 | Sreedharan et al. |

OTHER PUBLICATIONS

Cai, et al., "A Reliable Study of Software Reputation Based on User Experience", Retrieved at << http://www.bth.se/fou/cuppsats.nsf/6753b78eb2944e0ac1256608004f0535/f4197080c36c96d6c12575d600451a82?OpenDocument >>, Master Thesis, Thesis No. MSC-2009:19, 2009, pp. 1-63.

"Phishing Filter and Resulting Internet Communication in Windows Vista", Retrieved at << http://technet.microsoft.com/en-us/library/cc721947%28WS.10%29.aspx >>, Retrieved Date: Sep. 21, 2010, pp. 5.

"McAfee Web Gateway", Retrieved at << http://www.mcafee.com/us/local_content/solution_briefs/web_gateway_sb.pdf >>, pp. 4.

Maximilien, et al., "Reputation and Endorsement for Web Services", Retrieved at << http://www.google.com/url?sa=t&source=web&cd=6&ved=0CCoQFjAF&url=http%3A%2F%2Fciteseerx.ist.psu.edu%2Fviewdoc%2Fdownload%3Fdoi%3D10.1.1.103.8949%26rep%3Drep1%26type%3Dpdf&rct=j&q=based%20on%20reputation%20download%20software%20from%20web&ei=d0eYTJXIJ4SQjAfuxr0a&usg=AFQjCNGF4BrBixWPjecJfc7DhVCux8KDmQ&cad=rja >>, ACM SIGecom Exchanges—Chains of commitment, vol. 3, No. 1, 2002, pp. 24-31.

"Symantec Delivers Groundbreaking Reputation-based Security Technology", Retrieved at << http://www.symantec.com/about|news/release/article.jsp?prid=20090909_02 >>, Sep. 9, 2009, pp. 4.

Cai, et al., "Three-Dimensional Based Trust Management Scheme for Virus Control in P2P Networks", Retrieved at <<http://ieeexplore.ieee.org/stamp/stamp.jsp?tp=&arnumber=5501957 >>, Communications (ICC), 2010 IEEE International Conference on, May 23-27, 2010, pp. 5.

Jøsang, et al., "A Survey of Trust and Reputation Systems for Online Service Provision", Retrieved at<< http://www.oasis-open.org/committees/download.php/28303/JIB2007-DSS-Survey.pdf >>, vol. 43, Issue 2, Mar. 2007, pp. 1-43.

"Cisco Iron Port S-Series Web Security Appliances", Retrieved at << http://www.cisco.com/en/US/solutions/coliateral/ns170/ns896/ns895/ironport_s_series datasheet.pdf>>, Aug. 9, 2010, p. 1-9.

Viralm "New Feature for Norton Internet Security 2010—Download Insight", retrieved at << http://community.norton.com/t5/blogs/blogarticleprintpage/blog-id/npb1/article-id/325>>, Jul. 2, 2009, pp. 6.

"First Office Action Issued in Chinese Patent Application No. 201210018544.1", Mailed Date: Apr. 2, 2014, Filed Date: Jan. 20, 2012, 16 Pages.

* cited by examiner

REPUTATION CHECKING OF EXECUTABLE PROGRAMS

BACKGROUND

Executable programs, and files requiring executable programs to open, are available in all forms to computer users from many sources. Not only can such programs be downloaded from remote locations such as the cloud or other computers in a local area network, but they can be purchased at retail stores and provided by other computer users on computer-readable media such as compact discs (CDs) and DVDs. One problem with such programs, especially those obtained or purchased from other than well known vendors, is that any such program can pose a threat to the user's computer. For example, a user can launch such a program and unknowingly infect his or her computer with a virus or other malware. Often, malware is even disguised as another program in an attempt to deceive users into believing that it is safe to install the program on their computers.

Various approaches have been proposed for checking the reputation of files downloaded from the Internet. While these approaches may be convenient and effective when applied to downloaded files it would be advantageous to be able to check executable programs at the time a user enters a command to a computer's operating system software to launch the program, but before the program is actually run.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the claimed subject matter, a computing device executes a method by which a user command to initiate a launch of an executable program or computer code causes information regarding the program or code to be sent to a reputation service in the cloud. If the reputation service identifies the program as known to be safe, it returns an indication to the computing device and the program is permitted to be launched without any notification to the user that a reputation check has been made, if the reputation service identifies the program as unsafe or potentially unsafe, or does not recognize the program at all, an appropriate message is displayed for the user.

In another aspect of the invention, the user command causes the operating system first to check a local cache of reputation information on the computing device. If the local cache can confirm that the program or code is known to be safe, it is permitted to launch, typically without any notification to the user that a reputation check has even been made. If the local reputation cache identifies the program as unsafe or potentially unsafe, an appropriate message is displayed for the user. If the local cache does not recognize the program, or has no reputation information on it, the method accesses the reputation service in the cloud.

BRIEF DESCRIPTION OF THE DRAWINGS

The objects of the subject matter discussed herein will be better understood from the detailed description of embodiments which follows below, when taken in conjunction with the accompanying drawings, in which like numerals and letters refer to like features throughout. The following is a brief identification of the drawing figures used in the accompanying detailed description.

One skilled in the art will readily understand that the drawings are schematic in many respects, but nevertheless will find them sufficient, when taken with the detailed description that follows, to make and use the claimed subject matter.

DETAILED DESCRIPTION

Figure 1:
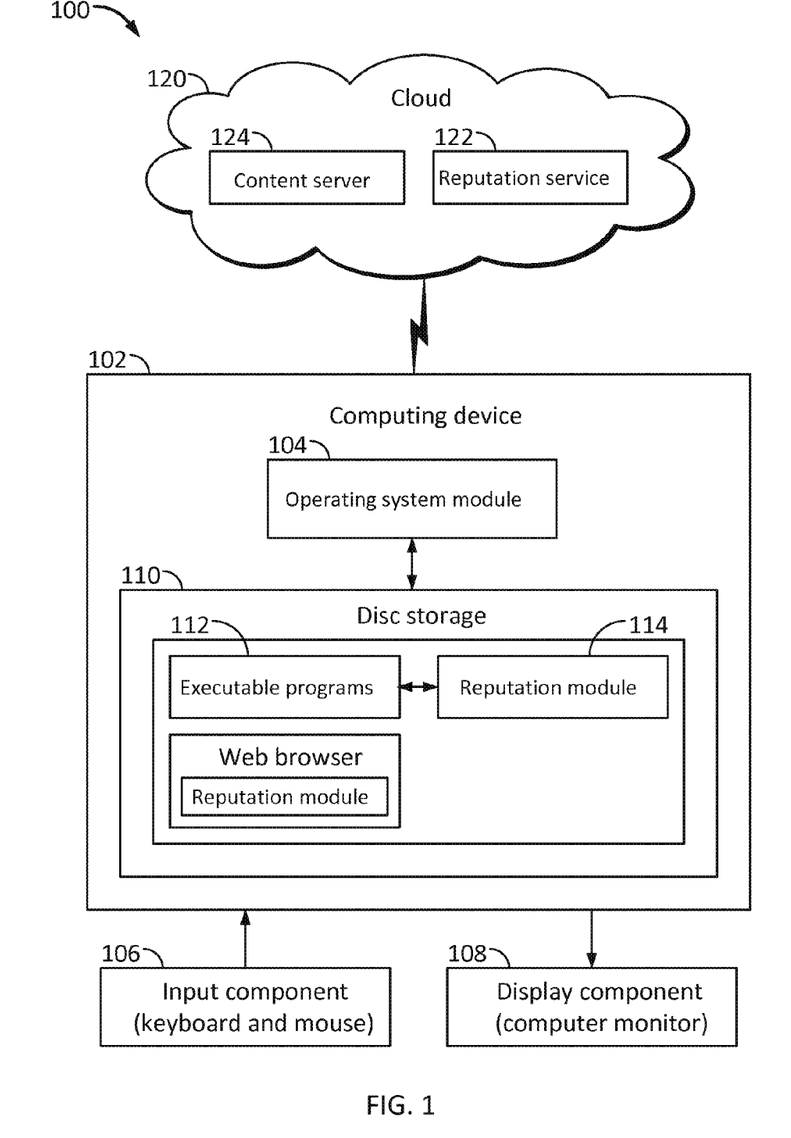
FIG. 1 schematically illustrates a system for implementing the reputation checking of executable programs in accordance with one or more embodiments.

FIG. 1 is a schematic diagram of a system 100 for implementing the method of checking the reputation of executable programs when they are launched in accordance with one or more embodiments described further below. The system of FIG. 1 also can check the reputation of obtained files in accordance with the co-pending U.S. patent application Ser. No. 12/880,363 mentioned above, and the following description highlights important differences between the methods and apparatus described herein and those described in that co-pending application.

Still referring to FIG. 1, the system 100 includes a computing device 102 that incorporates an operating system module 104 stored on a non-transitory computer-readable storage device as encoded, computer-executable instructions for controlling the computing device 102. These instructions, when executed by a processor, cause the computing device to perform according to the method embodiments described herein. The computing device 102 also includes an input component 106, which in a typical implementation will comprise a conventional pointing device such as a mouse and a keyboard, although many other input components could be used, such as a touch screen activated by a user's hand or a pen, voice commands, and the like. A user of the computing device typically uses the input component 108 to provide commands in a known manner to the operating system module 104 via a graphical user interface displayed on a display component 108, such as a computer monitor.

As used in this description, the terms "component," "module," "system," "apparatus," "interface," or the like are generally intended to refer to a computer-related entity, either hardware, a combination of hardware and software, software, or software in execution. For example, such a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computer, any of the functions or techniques described herein can be implemented using software, firmware, hardware (e.g., fixed logic circuitry), manual processing, or a combination of these implementations. In the case of software implementation, the module or component represents program code that performs specified tasks when executed on a processor (e.g., CPU or CPUs). The program code can be stored in one or more computer readable memory devices. The features of the reputation checking techniques discussed in detail below are platform-independent, meaning that they can be implemented on a variety of commercial computing platforms. It will be further understood that a "module," as used herein, and particularly in FIG. 1, is not necessarily, and typically is not, a physically separate component. The modules referred to in connection with FIG. 1 are to be understood in a broad sense as information in the form of executable instructions, storage locations, etc., that may be, and typically are, distributed across various locations in the storage media on which they reside.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disc, floppy disc, magnetic strips . . . ), optical discs (e.g., compact disc (CD), digital versatile disc (DVD) . . . ), smart cards, and flash memory devices (e.g., card, stick, key drive . . . ). Of course, those skilled in the art will recognize that many modifications may be made to configurations discussed herein without departing from the scope or spirit of the claimed subject matter. Moreover, the term "computer" or "computing device" is not meant to be limiting in any manner. For example, the computing device 102 can be a desktop computer, a mobile station, a netbook or laptop computer, a notepad or tablet computer, an entertainment appliance, a set-top box communicatively coupled to a display device, a cellular or other wireless phone, a personal digital assistant, a smart phone, a television, game console, an automotive computer, and so forth. Thus, the computing device 102 may range from a hill resource device with substantial memory and processor resources (e.g., personal computers, game consoles) to a low-resource device with limited memory and/or processing resources (e.g., traditional set-top boxes, hand held game consoles).

Returning to FIG. 1, the computing device 102 further includes a disc storage 110 that includes an executable program module 112 and a reputation module 114 that cooperates with the executable program module 112 in a fashion described further below. The disc storage is typically a non-transitory computer-readable storage component. A user of the computing device can launch executable programs stored in the executable program module 112 by using the input component 108 in a known fashion to issue commands to the operating system module 104 via the graphical user interface discussed above. A web browser 116 is a particular type of executable program, also under the control of the operating system module 104, that allows a user of the computing device 102 to use the Web browser 116 to browse or otherwise navigate to a Web site and download files from a content server 124. The Web browser 116 includes its own reputation module 118.

The computing device 102 can communicate with the cloud 120, which can be a variety of different networks, including one or more of the Internet, a local area network (LAN), a public telephone network, an intranet, other public and/or proprietary networks, a reputation service provided by an in-house server or by an enterprise, combinations thereof, and so forth. In other words, the system 100 accesses a reputation service that is "remote," that is, separate, from the computing device 102. The cloud includes a reputation service module 122 with which the computing device 102 can communicate via many types of connections using various protocols or technologies, such as a conventional Internet connection, universal serial bus (USB) connections, wireless USB connections, infrared connections, Bluetooth connections, and so forth. The Web browser 116 enables the user to download files and programs from one or more content server modules 124 in the cloud 120. Alternatively, files and programs can be obtained by the Web browser 116 from other sources, such as another computing device coupled to the computing device 102 via the cloud 120 or via another type of connection. In addition, the computing device 102 can communicate with the reputation service module 122 other than via the Web browser 116, as discussed in more detail below. Although a single computing device 102 is illustrated in FIG. 1, it is to be appreciated that the reputation service module 122 can, and typically does, communicate with multiple computing devices similar to the device 102.

The reputation service module 122 can be one or more computing devices that maintain and provide reputation information regarding programs and flies, as discussed in more detail below. Typically the reputation service module 122 is implemented using one or more server computers, although a variety of different types of computers (e.g., similar to the discussion above with respect to computing device 102) can be used to implement the reputation service 122. As noted above, the reputation service 122 is accessed via the cloud 120 or other connection, and is also sometimes referred to herein as being a remote reputation service. In that regard, various reputation service modules (all of which are meant to be included by the representation of the module 122) can be in close physical proximity to the computing device 102 (e.g., in the same room or building), or far-removed from the computing device 102 (e.g., in another state or country).

Co-pending U.S. patent application Ser. No. 12/880,363 deals with actions that are taken when a file is downloaded or otherwise obtained by a Web browser of a computer. In that event, information identifying the file is provided to the reputation module 118. This information is sent to the remote reputation service 22, which identifies a reputation indication for the identified file and returns the reputation indication to the reputation module 118. The reputation indication is an indication for example, whether the identified file is a low risk of being malware or a high risk of being malware. Based on the reputation indication, the reputation module 118 determines an appropriate user interface for the Web browser 116 to display with regard to the newly obtained file. For example, if the reputation indication identifies the file as being a low risk of being malware then the Web browser can install and/or run the program in the file without displaying a warning. However, if the reputation indication identifies the file as being a high risk of being malware, the Web browser can display a warning and/or recommendations to the user regarding installing and/or running the program in the file.

In contrast, the reputation module 114 responds to a user's command to the operating system module 104 to launch any executable program or computer code from the executable programs module 112. Broadly speaking, upon receiving a command from the input component 106, the operating system module 104 causes the reputation module 114 to initiate a reputation check on the program in accordance with the principles and methods discussed further below in more detail. The reputation module 114 may contain a local cache of reputation information on programs. If a program the user desires to launch is "trusted," that is, if the local cache confirms that the program represents a low risk of causing the computing device 102 to malfunction, the operating system module causes the program to run without any notification to the user that a reputation check has even been made. If the local cache does not recognize the program, or has no reputation information on it, the reputation module 114 initiates a reputation check by accessing the reputation service module 122 in the cloud. If the reputation service module 122 identifies the program as known to be safe (that is, trusted), it returns an indication of such to the operating system module, which causes the program to run, again without any notification to the user that a reputation check has been made. If the reputation server 122 (or the local reputation cache) identifies the program as unsafe or potentially unsafe, or does not recognize the program at all, it provides an appropriate message to the user on the display component 108. The message may prompt the user to enter a command indicating how the user wants to proceed. For example, the prompt could allow the user to proceed with the launch of the program, or have the program deleted or quarantined, or initiate other action or actions.

Figure 2:
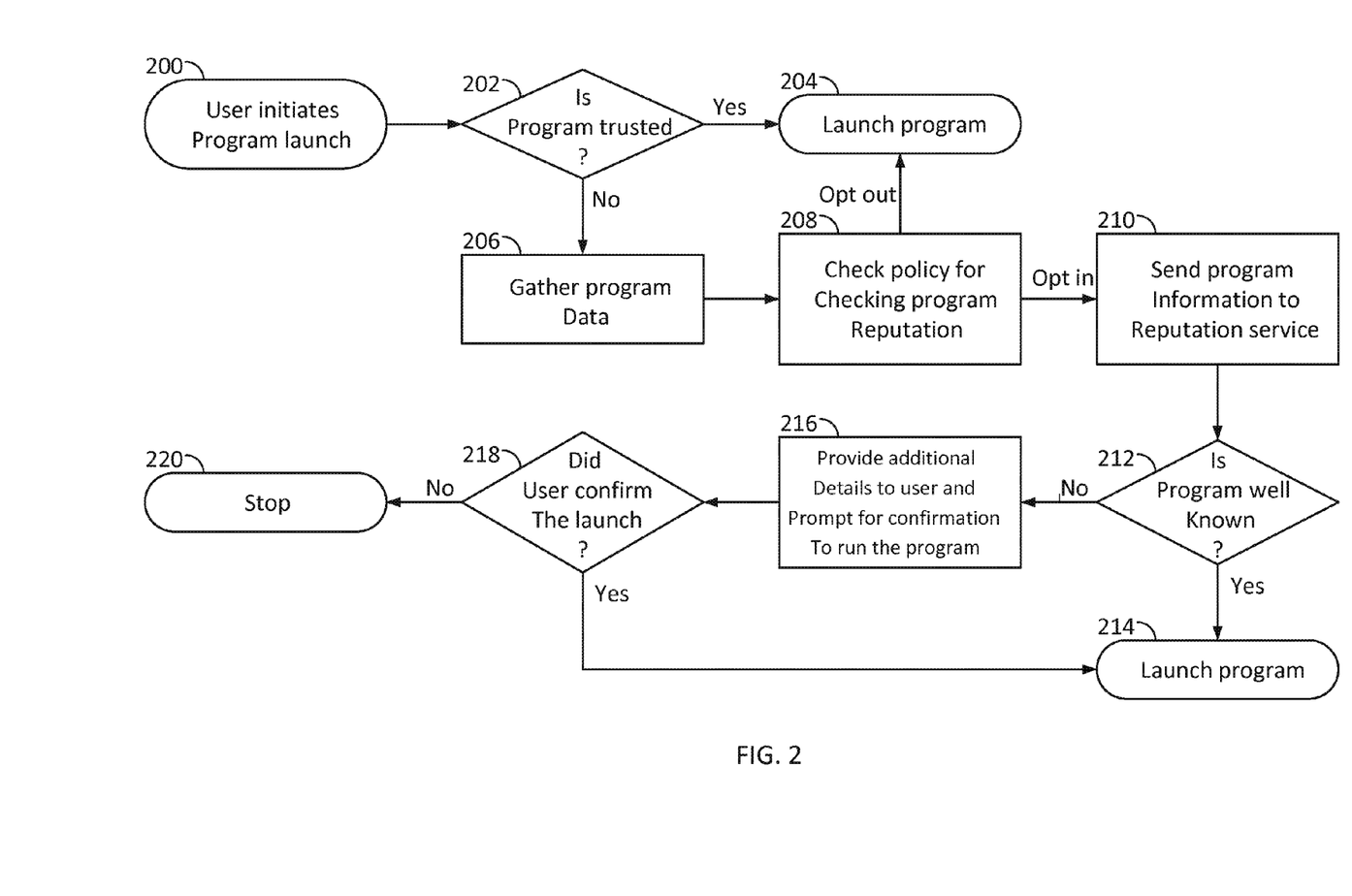
FIG. 2 is a detailed flowchart of an embodiment of a reputation checking method according to the claimed subject matter.

FIG. 2 is a flowchart that illustrates an example of a method for performing a reputation check on an executable program in accordance with one embodiment of the claimed subject matter. Step S200 represents an action by the user (using a mouse or other input component such as a touch screen) that commands the operating system module 104 to launch an executable program stored on the disc storage 110 as discussed above. Typically, the reputation check referred to in step S202 is initiated when the operating system responds to the user command by executing the application programming interface used by the operating system to launch executable programs. If the user has chosen to automatically check the reputation of programs he or she desires to run (as discussed below in connection with FIG. 3), the process proceeds to step S202.

Step S202 checks the local reputation cache in the reputation module 114 to determine if it contains reputation information about the program. If the reputation module indicates that the program is trusted, the operating system module 104 causes the program to launch in step S204. As mentioned above, the user normally is not notified that the operating system has checked the reputation of the program if the reputation module finds it to be trusted. However, if the reputation module's local cache of reputation information cannot verify that the program is trusted, the flowchart proceeds to step S206, which begins a process of reputation checking with the reputation service 122 in the cloud. On the other hand, if the local cache knows that the program presents a risk of causing the computing device to malfunction, it can instruct the operating system to take appropriate action. This might be displaying a notification on the display component that prompts the user to decide how to proceed. Types of notifications provided to the user are discussed below in connection with FIG. 4.

The reputation module 114 applies predetermined criteria to decide whether or not to proceed to step S206 and initiate a reputation check beyond the local cache of reputation information. For example, in one embodiment the operating system module 102 applies an identifier that will cause the reputation module to proceed to step S206. This identifier is typically applied to indicate that the program originated from a location other than the disc storage on the user's computer device. Examples are programs originating from e-mails, programs originating from other computer devices on the same local area network as the user's computer device 102, programs originating with LAN messenger programs, programs loaded onto the computing device via a USB connection, programs originating from the cloud (for example, from a content server 124), programs that are not signed, or any other criteria that could indicate that the program could present a risk to the user's computer device.

Step S206 assembles the information necessary for the cloud reputation service 122 to perform a reputation check on the program. It will be appreciated that the specific information provided depends on the manner in which the reputation service performs the reputation check. The reputation module 114 will include software that assembles this information in any appropriate form. Examples of information sent to the reputation service are the program type, which could include any file with the extension .EXE, screen saver programs, software components used for the installation, maintenance, and removal of software on the disc storage, and the like. In addition to the program type, information that uniquely identifies the file being sent, such a file hash code, digital signature, name of the file, or other identifying code that the reputation service will use in making its reputation check.

Figure 3:
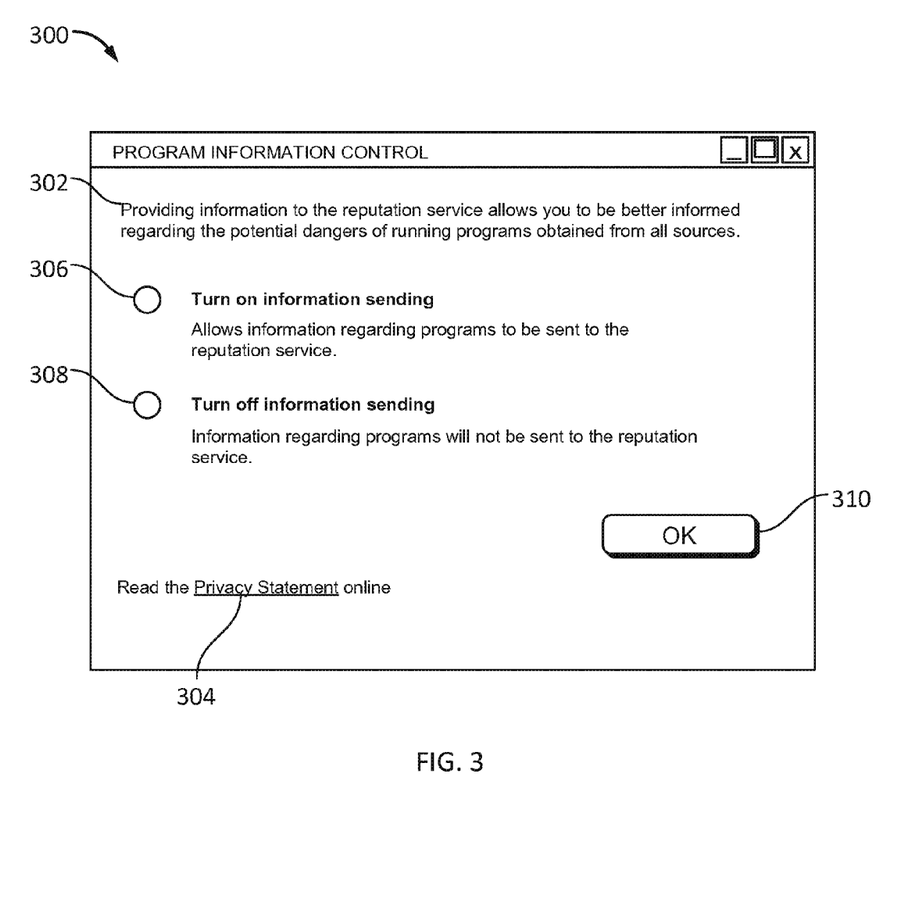
FIG. 3 illustrates an example of a user interface that can be displayed to a user to allow the user to select whether or not reputation checks should be made in accordance with the embodiment shown in FIG. 2.

Next, the process determiners in step S208 checks to see if the user has indicated that his or her policy is not to perform reputation checks. FIG. 3 illustrates a sample user interface that can be displayed on the display component 106 to allow the user to select whether or not the reputation module 114 will automatically perform a reputation check. A control window 300 displayed on the display component 108 includes a description 302 explaining to the user why the reputation module 114 would send information to a remote reputation service if the reputation check is enabled. A link 304 to a privacy statement is also displayed, if the user selects link 304, a privacy statement (not shown) of the reputation service 122 is displayed, explaining to the user how no user-identifying information is sent and/or how the information sent to the remote reputation service 122 is kept confidential. For example, information identifying a program and/or a user action that is taken may be sent to reputation service 122, but no indication of the user of computing device 102 need be provided to reputation service 122 (or if provided, need not be retained thereby). Additionally, the user is able to select a radio button 306 to opt-in to the sending of information to the remote reputation service 122, or a radio button 308 to opt-out of sending of information to the remote reputation service 122. The user then selects an "OK" button 310 to have the selection saved. It is to be appreciated that radio buttons and an "OK" button are only examples of user interfaces that can be presented to a user to opt-in or opt-out of sending information to the remote reputation service 122, and that a variety of other conventional user interface techniques can alternatively be used. It is also possible to further refine this step so that the user can opt in or opt out of checks of particular program or file types. For example, the user may only want to check the reputation of programs that originated with e-mail messages.

Typically, the operating system module will set the reputation module 114 to automatically send program information to the reputation service if the local cache cannot confirm that the program is safe. However, if the user has opted out of this operating system default setting using the control window shown in FIG. 3, the flow returns to step S204 and the operating system module launches the program without a reputation check by the reputation service 122. Otherwise, the information is sent to the reputation service in step S210. The reputation service uses the information sent by the reputation module 114 to perform a reputation check in step S212. A reputation check in accordance with step S212 can involve many criteria, and return a wide variety of information to the user. Examples of information returned by the reputation service include notification that the originator of the program is unknown to the reputation service, that the reputation service does not recognize the program, that the program is known to be malware capable of causing the computing device to malfunction, just to name a few. Although the reputation service can return a, wide variety of reputation information, for purposes of illustration the present embodiment simply checks to see if the reputation service can identify the original or of the program.

If the program originator is known by the reputation service 122 to publish reliable programs presenting little or no risk of damage or compromise to the user's computer device 102, the process proceeds to step S214 to launch the program. This step is essentially the same as step S204, and normally the user is not informed that a reputation check was even made. However, if the reputation service cannot verify the program publisher, step S216 returns information from the reputation check to the reputation module 114, which displays in a window such as that shown in FIG. 4 a warning based on the reputation information returned by the reputation service 122.

Figure 4:
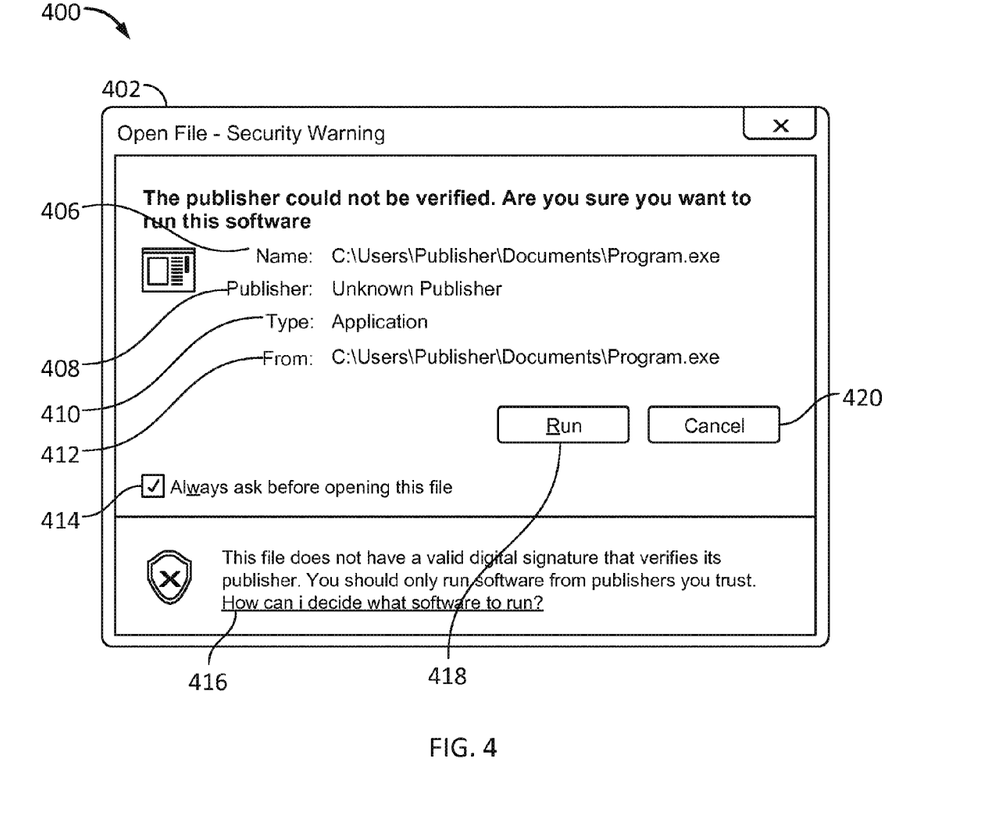
FIG. 4 is an example of one type of message provided to the user of the system in response to a reputation check in accordance with the embodiment shown in FIG. 2.

The control window user interface 400 in FIG. 4 is displayed on the display component 108 to allow the user to select whether or not to run the program. It includes a description 402 explaining to the user that it contains a security warning and text 404 explaining the nature of the potential threat. This example includes the name 406 of the program that was launched, text 408 indicating that the publisher of the program is unknown to the reputation service, the type 410 of the program, and the origin 412 of the program. The interface includes a check box 414 by which the user can instruct the reputation module to always provide a warning. When a launch of this program is initiated. If the user elects not to be warned again when launching the same program, an indication is made in the reputation module 114 to launch the program without performing the reputation check in step S202 of FIG. 2. The control window can also include other information 416 that might be useful to the user in deciding whether or not to continue with the program launch. Additionally, the user is able to select a "Run" button 418 that instructs the operating system to continue with the program launch, or a "Cancel" button 420 that cancels the program launch. As noted above, the control window in FIG. 4 can also provide the user with numerous other options, such as deleting or quarantining the program so that it cannot be accessed in the future.

Step S218 reflects the user's choice of either the "Run" button 218 or the "Cancel" button 220. If the user chose the "Run" button, the process proceeds to step S214 to launch the program. If the user chose the "Cancel" button, the process proceeds to step S220 to abort the program launch. The reputation module 114 can further communicate the user's choice to the reputation service 122. This information is used by the reputation service to continue to build on the reputation information available to subscribers of the service. For example, if multiple users launch an unknown program without causing their computing devices to malfunction, the reputation service can change the nature of the information returned to future users to indicate that the program is not known to cause malfunctions.

In another aspect of the invention, the information returned by the reputation service 122 can include a quantitative rating of the risk that the program is malware that will cause the computing device 102 to malfunction. One such embodiment would assign a numerical rating between, say, 1 and 10, to the risk involved in launching a program. For example, if the reputation service had sufficient information to determine that a program was almost certainly not malware, it might give the program a rating of "1." At the other end of the scale, if the program was known to be malware that would definitely cause the computing device to malfunction, the reputation service would give the program a rating of "10." Other examples might be that the reputation service has accumulated information that multiple users have launched the program without damage to their computing devices, but a rating algorithm used by the reputation service determines that the number of such users of which it is aware is too low to give the program a "1" rating. In that case, the reputation service might give the program a lesser rating that takes into account that the reputation service has what its rating algorithm considers to be incomplete information. If the reputation has no information on the program, this could be reflected in the same rating system, or it could be a separate category of information returned to the reputation module 114. It will be understood that the numerical rating scale of 1 to 10 described here is meant simply as an example and other rating systems can be used in this connection.

This numerical rating is used by the operating system module 104 in the following fashion. The operating system module will typically require any program being launched in response to a user command to meet a certain level of privilege. This is a safeguard built into most operating system software and is well known to those skilled in the art. For example, there are a number of areas of the operating system and other modules of the computing device that must be accessed to enable the operating system actually to launch a particular executable program and permit it to be used. As those skilled in the art know, the number and nature of such areas can vary from program to program. Accessing certain areas or modules can create a greater risk of harm to the computing device than others if a program is malware. To enhance protection against malfunction of the computing device by completing the launch of a particular program and using it, the reputation module 114 provides to the operating system 104 module the numerical rating returned by the reputation service 122. The operating system then matches that rating against the privilege requirements of the program. The operating system uses a policy setting to determine whether or not there is sufficient confidence that the program's rating meets or exceeds the privilege requirements reflected by its required level of privilege. It will be appreciated that the match between the program's reputation and its privilege requirements is somewhat arbitrary, and those skilled in the art will be able to formulate an appropriate algorithm that will provide adequate protection for the computing device. However, a guiding principle is that the rating system be designed so that the rating provided by the reputation service reflects a predetermined level of confidence that the program meets or exceeds the privilege requirements it needs to be used.

If the program rating is as high or higher than the minimum rating required by the level of privilege needed by the program, the operating system module 104 continues with the launch of the program without notifying the user. In other words, the method shown in FIG. 2 proceeds to step S214 as discussed above. However, if the program requires a higher level of privilege than is warranted by the rating, the operating system can display a notification similar to that shown in FIG. 4. (If the system is set up so that unknown programs are not given a rating, the screen in FIG. 4 is still used.)

With a rating system like that described here, this notification can provide the user with various categories of information and options. In one embodiment, the notification would display the rating given to the program, the maximum level of privilege the program should be permitted to access based on the rating, and the level of privilege the program requires to run on the computing device. (As noted above, one skilled in this art will be able to program the operating system to display this information on the display component 108.) The notification screen can include a radio button or check box that permits the user to choose to run the program without restriction. This would reflect the user's determination that the reputation rating of the program is sufficient to warrant launching it anyway. For example, the rating might be a "4," Which in one embodiment might indicate that the reputation service has sufficient information based on other users' experiences and has no information that the software publisher is known to provide malware, but still does not have extensive information on the software publisher's reliability. In turn, the program might require a level of privilege just above the maximum to which the program is entitled to access in that event, the user could choose to launch the program anyway. Another choice that might be given to the user is to run the program in a virtual environment. That is, the program, even one with a very poor rating, could be run without requiring access to any part of the actual operating system module 104, and instead be granted access to a virtualized copy of the same module. Thus, even if the program turned out to in fact be malware, it would not damage the actual operating module 104.

It will be also be appreciated that the method just described is not limited to checking the reputation of executable programs per se. For example, many files and documents require the launch of executable programs to view the file or document. The methods discussed herein, and the subject matter claimed, are also applicable when the operating system receives a user command to open such a file or document. That is, "a user command for initiating a launch of executable code" is intended to include a user command to open a file or documents requiring the launch of such code in this specific application the identifier discussed above as applied to programs being launched to initiate a reputation check could also be applied to files with any of the following extensions: .PDF, .DOC, .DOCX, .ZIP, .INI, .MP3, and .WAV, just to name a few. Then, a reputation check could be performed, on such files if they originated from a location other than the disc storage on the user's computer device, as in the examples listed above, such as files originating from e-mails, from other computer devices on the same local area network as the user's computer device 102, files originating with LAN messenger programs, programs originating from the cloud ((or example, from a content server 124), files that are not signed, or any other criteria that could indicate that the file could present a risk to the user's computing device. The method described above in connection with FIG. 2 for checking the reputation of programs could be applied to such documents when the user instructs the operating system module to open the document in a program adapted to that purpose.

Summarizing, the reputation information maintained by the remote reputation service indicates a reputation for an executable program. Generally, the reputation is an indication of how trustworthy and/or reliable the program is perceived by the reputation service, and can be based on actions taken with the program (such as running the program) by other users. The reputation for a program can indicate, for example, whether the program is known to be non-malware, whether the program is known to be malware, how frequently the program is run by other users, and so forth. The reputation for a program can be further based on, for example, how frequently the program is run, whether the program has been reported as being malware, and so forth. The remote reputation service can obtain information to determine the reputation for a program from various sources, such as computing devices that run the program, a trusted third party service, an administrator or other trusted user of the reputation service, and so forth. The reputation information maintained by the remote reputation service can also include other information, such as that a newer version (that is, more reliable) is available. The reputation information maintained by the remote reputation service can also include a link to a location where the newer version of the program can be downloaded, and could provide such a link as part of the reputation indication that is returned to the reputation module 114.

In one or more variations, the remote reputation service returns to the reputation module 114 a reputation indication that is a particular value or rating that comprises different values or ratings associated with particular reputations. Table I includes examples of different values or ratings that can be returned by the remote reputation service to the computing device 102. It should be appreciated that the values or ratings in Table are examples, and that other values or ratings can alternatively be used.

TABLE I

| Value | Description |
|---|---|
| 1 | The program is well-known and a low risk of being malware. |
| 2 | The program is not well-known and is a high risk of being malware. |
| 3 | The program is known to be malware. |
| 4 | The program is an out-of-date or unsecure version. |
| 5 | The program type is not supported thus no indication regarding risk is being provided by the reputation service. |
| 6 | The program is not reliable, causes poor performance, or is not compatible. |

The values 1, 2, and 3 would be comparable to the quantitative ratings given to a program as discussed above in connection with matching a program rating and its required level of privilege. For a reputation value of "4," the reputation module 114 could cause the display component to display an appropriate message to the user concerning where in the cloud (say, on the Internet) an up-to-date version of the program can be obtained. Value "5" is similar to the information returned when the reputation service has no information on the program. Value "6" does not indicate that the program will damage the computing device, but that it could, for example, slow its operation.

Generally speaking, the techniques discussed herein can be implemented in software, with instructions being executed by one or more processing units. Typically, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of checking the reputation of executable code before it is executed by an operating system of a computing device, the method including:
   inputting a user command to the operating system for initiating a launch of said executable code;
   determining whether or not a local cache on said computing device includes local reputation information relating to the risk that launching said executable code will cause said computing device to malfunction;
   if said local reputation information confirms that launching said executable code represents a low risk of causing said computing device to malfunction, launching said executable code; and
   if said local reputation information fails to confirm that launching said executable code presents a low risk of causing said computing device to malfunction, sending information necessary to perform a reputation check regarding said executable code to a reputation service remote from said computing device, wherein said remote reputation service uses said information regarding said executable code to generate reputation information relating to the risk that launching said executable code will cause said computing device to malfunction; and
   receiving said reputation information from said remote reputation service at said computing device, said reputation information including a quantitative rating of the risk of launching said executable code,
      wherein said executable code is launched by said operating system without notifying the user of the computing device when said reputation information indicates that said executable code presents a low risk of causing said computing device to malfunction, and
      wherein said operating system prevents launch of said executable code and provides a notification to the user when said reputation information from said reputation service or said local reputation information indicates that said executable code presents a risk of causing said computing device to malfunction,
      said notification to the user includes (a) the quantitative rating given to the executable code, (b) a maximum level of privilege the executable code should be permitted to access based on the quantitative rating, and (c) a level of privilege the executable code requires to run on the computing device,
      wherein after receiving said notification the user can choose each of the following actions: (i) continuing with the launch of the executable code, (ii) aborting the launch of the executable code, and (iii) launching the executable code in a virtual environment not requiring access to said operating system.

2. A method as in claim 1, wherein said remote reputation service is accessible to multiple other said computing devices as a cloud service, and said reputation information is based at least in part on the information regarding said executable code provided by users of said other computing devices.

3. A method as in claim 1, wherein said user command instructs said operating system to open a file or document that requires said executable code to open.

4. A method as in claim 1, wherein said executable code comprises an executable program.

5. A method as in claim 1, wherein said sending step is performed if said executable code includes an identifier indicating that said executable code originated from at least one of e-mails, other computer devices on the same local area network as said computing device, LAN messenger programs, a USB connection to said computing device, or the cloud, or said executable code is an unsigned executable program.

6. A computing device comprising:
   an operating system module with executable instructions for carrying out operations in response to user commands;
   a computer-readable storage component not consisting of a propagated signal comprising an executable programs module for storing computer programs including executable code that can be launched responsively to user input and a reputation module for communicating with said executable programs module; and
   an input component for accepting user commands for initiating the launch of a selected executable program, wherein said reputation module sends information regarding said selected executable program to a reputation service remote from said computing device in response to a said user command, and said reputation module receives reputation information from said reputation service, said reputation information including a quantitative rating of the risk of launching said executable code, and said reputation information relating to the risk that launching said selected executable program will cause said computing device to malfunction and being generated using said information regarding said selected executable program sent by said reputation module;
   wherein said selected executable program is launched by said operating system without notifying the user of said computing device when said reputation information indicates that said selected executable program presents a low risk of causing said computing device to malfunction,
   wherein said reputation module includes a local cache of local reputation information relating to the risk that launching said selected executable program will cause said computing device to malfunction;
   wherein said operating system launches said selected executable program if said local reputation information confirms that said selected executable program presents a low risk of causing said computing device to malfunction;

wherein said reputation module sends said information regarding said selected executable program to said reputation service if said local reputation information fails to confirm that launching said selected executable program presents a low risk of causing said computing device to malfunction;

wherein said computing device includes an output component and said operating system prevents launch of said selected executable program and provides a notification on said output component, when said reputation information from said reputation service or said local reputation information indicates that said selected executable program presents a risk of causing said computing device to malfunction, said notification to the user including (a) the quantitative rating given to the executable code, (b) a maximum level of privilege the executable code should be permitted to access based on the quantitative rating, and (c) a level of privilege the executable code requires to run on the computing device, and wherein said notification is displayed on a computer monitor as a user interface that enables the user to choose each of the following actions: (i) continuing with the launch of the selected executable program and (ii) aborting the launch of the selected executable program, and (iii) launching the selected executable program in a virtual environment not requiring access to said operating system.

7. A computing device as in claim 6, wherein said remote reputation service is accessible to multiple other said computing devices as a cloud service, and said reputation information is based at least in part on the information regarding said executable code provided by users of said other computing devices.

8. A computing device as in claim 6, wherein said reputation module sends said information regarding said selected executable program if said selected executable program includes an identifier indicating that said selected executable program originated from at least one of e-mails, other computer devices on the same local area network as said computing device, LAN messenger programs, a USB connection to said computing device, or the cloud, or if said selected executable program is not signed.

* * * * *